US006796112B1

(12) United States Patent
Price

(10) Patent No.: US 6,796,112 B1
(45) Date of Patent: Sep. 28, 2004

(54) MULTI-BLADE LAWN MOWER WITH OFFSET WHEEL

(75) Inventor: Howard B. Price, Chesterfield, MO (US)

(73) Assignee: Howard Price Turf Equipment, Inc., Chesterfield, MO (US)

( * ) Notice: Subject to any disclaimer, the term of this patent is extended or adjusted under 35 U.S.C. 154(b) by 0 days.

(21) Appl. No.: 10/390,814

(22) Filed: Mar. 18, 2003

(51) Int. Cl.$^7$ .............................................. A01D 75/30
(52) U.S. Cl. ............................................. 56/6; 56/14.9
(58) Field of Search ........................... 56/6, 14.9, 15.1, 56/15.2, 15.3, 15.6, 15.7, 15.8, 16.2, 16.3, 17.1, DIG. 10, DIG. 22

(56) References Cited

U.S. PATENT DOCUMENTS

| 4,301,881 | A | * | 11/1981 | Griffin | 180/6.48 |
| 6,000,202 | A | | 12/1999 | Laskowski | |
| 6,065,274 | A | | 5/2000 | Laskowski et al. | |
| 6,530,200 | B1 | * | 3/2003 | Minoura et al. | 56/17.1 |
| 6,588,188 | B2 | * | 7/2003 | Dennis | 56/16.3 |

OTHER PUBLICATIONS

Two-sided catalog sheet for 360Z-80, manufactured by Howard Price Turf Equipment, no date.
Catalog entitled *The Articulator For a World That Isn't Flat*, by Lastec., no date.
Catalog for Blazer 360Z, manufactured by Howard Price Turf Equipment., no date.

* cited by examiner

Primary Examiner—Árpád F Kovács
(74) Attorney, Agent, or Firm—Thompson Coburn, LLP

(57) ABSTRACT

A lawn mower comprises an articulating mowing deck and a caster wheel assembly for supporting and facilitating travel of the mowing deck. The articulating mowing deck includes an inboard deck portion and an outboard deck wing portion. The inboard deck portion and outboard deck wing portion each have at least one cutting blade. The outboard deck wing portion is pivotally attached to the inboard deck portion in a manner so that the outboard deck wing portion is pivotable about a horizontally disposed deck wing pivot axis. The axis extends generally from a forward portion of the articulating mowing deck toward a rear portion of the articulating mowing deck. The outboard deck wing portion is pivotable about the axis between a cutting position and a transport position. When the outboard deck wing portion is in its cutting position, an outboard cutting blade rotates in a plane that is generally parallel to terrain over which the outboard deck wing portion travels. In the transport position, the outboard deck wing portion and outboard cutting blade are pivoted upwardly from the terrain and generally inwardly toward the inboard deck portion about the pivot axis. The caster wheel assembly includes a mounting arm with a proximal portion and a distal portion, which carries a caster wheel. The proximal portion is mounted to the inboard deck portion inboard of the pivot axis. The distal portion extends forwardly and laterally outwardly from the proximal portion so that the caster wheel carried by the distal portion is located outboard of the pivot axis.

18 Claims, 2 Drawing Sheets

MULTI-BLADE LAWN MOWER WITH OFFSET WHEEL

BACKGROUND OF THE INVENTION

The present invention relates to lawn mowers with multiple cutting blades and, more particularly, to an improved manner of supporting the mowing deck of such lawn mowers.

In many lawn mowing applications, it is desirable to use lawn mowing vehicle that is capable of cutting a relatively wide path of grass, in order to reduce the time it takes to handle particularly large lawns and fields. Many lawn mowing vehicles include multiple cutting blades arranged generally side by side to provide a wide cutting path. However, in general, the multiple cutting blades needed to achieve a wide cutting path are carried by a correspondingly wide mowing deck. While the wider mowing deck makes it possible to handle particularly large lawns and fields in reduced time, it is also more likely to encounter terrain irregularities, such as hills and valleys. To address the issue of such terrain irregularities, many prior art lawn mowing vehicles have utilized articulating mowing decks, which permit the cutting blades carried by the deck to articulate over terrain irregularities, thereby increasing the likelihood that the grass will be cut uniformly, even over undulating terrain.

Another issue posed by particularly wide mowing decks is compromised maneuverability and agility of the mowing vehicle. For example, particularly wide mowing deck makes it more difficult to corner and move efficiently through relatively tight spaces. Lawn moving vehicles with particularly wide mowing decks also take more storage space when not in use, and require wider trailers for transport. To address this issue, some prior art lawn mowing vehicles have utilized mowing decks comprising a central deck portion and at least one outboard deck wing portion, which carries an outboard cutting blade, wherein the outboard deck wing portion is pivotally connected to the central deck portion so that it can be folded upwardly when not in use. This narrows the overall width of the mowing vehicle when it is necessary to maneuver through a relatively narrow space, or for transport or storage of the mowing vehicle when not in use.

In general, prior art lawn mowing vehicles with wide mowing decks support the mowing deck with a plurality of wheels, which support the weight of the deck in several locations about its periphery. For articulating mowing decks with two or more deck portions that move relative to one another, it is necessary to support each deck portion with one or more wheels, so that as each wheel moves over the terrain, its associated deck portion correspondingly moves over the terrain in response to terrain undulations. However, in either case, due to the overall weight of the vehicle and mowing deck, such support wheels can cause undesirable "streaking" by flatting the grass in their paths as they roll. The narrow path of grass that is flattened under a support wheel at the front (leading) end of the deck may not be properly cut by the blades, resulting in the undesirable "streaking" of grass behind the mower. Also, in prior art mowing machines having articulating decks, the support wheels are positioned about the periphery of the deck in locations that are optimal for supporting the deck during use, but which may not also be optimal for providing stable support of the deck when one or more of the outboard deck wing portions are folded upwardly.

Thus, there is a need for a lawn mower comprising an improved manner of supporting the mowing deck.

SUMMARY OF THE INVENTION

It is therefore an object of the present invention to provide a lawn mower with a mowing deck having multiple cutting blades, wherein the deck is supported by forward support wheels that are positioned to minimize streaking. Another object of the invention is to provide a lawn mower with a mowing deck supported by forward support wheels that are positioned to provide stable support for the deck, whether an outboard deck wing portion is engaged in a cutting position or folded upwardly in a non-cutting position.

In general, a lawn mower of the present invention comprises a mowing deck, an inboard cutting blade, an outboard cutting blade, and a caster wheel assembly for supporting and facilitating travel of the mowing deck. The inboard cutting blade is mounted to the mowing deck for rotation in a generally horizontal plane. The outboard cutting blade is mounted to the mowing deck outboard of the inboard cutting blade. The outboard cutting blade is mounted to the mowing deck for rotation relative thereto. The caster wheel assembly has a mounting arm with a proximal portion and a distal portion, which carries a caster wheel. The proximal portion of the mounting arm is mounted to a forward portion of the mowing deck located within a cutting path of the inboard cutting blade. The distal portion of the mounting arm extends forwardly and laterally outwardly from the proximal portion so that the caster wheel carried by the distal portion of the mounting arm is located within a cutting path of the outboard cutting blade.

In another aspect of the present invention, a lawn mower comprises an articulating mowing deck and a caster wheel assembly for supporting and facilitating travel of the mowing deck. The articulating mowing deck includes an inboard deck portion and an outboard deck wing portion. The inboard deck portion has an inboard cutting blade mounted to the inboard deck portion for rotation in a generally horizontal plane. The outboard deck wing portion is pivotally attached to the inboard deck portion in a manner so that the outboard deck wing portion is pivotable about a horizontally disposed deck wing pivot axis. The axis extends generally from a forward portion of the articulating mowing deck toward a rear portion of the articulating mowing deck. The outboard deck wing portion is pivotable about the deck wing pivot axis between a cutting position and a transport position. When the outboard deck wing portion is in its cutting position, an outboard cutting blade mounted to the outboard deck wing portion rotates in a plane that is generally parallel to terrain over which the outboard deck wing portion travels. When the outboard deck wing portion is in its transport position, the outboard deck wing portion and outboard cutting blade are pivoted upwardly from the terrain and generally inwardly toward the inboard deck portion about the deck wing pivot axis. The caster wheel assembly includes a mounting arm with a proximal portion and a distal portion, which carries a caster wheel. The proximal portion of the mounting arm is mounted to the inboard deck portion inboard of the pivot axis. The distal portion of the mounting arm extends forwardly and laterally outwardly from the proximal portion so that the caster wheel carried by the distal portion is located outboard of the pivot axis.

In still another aspect of the invention, a lawn mower with an articulating mowing deck comprises a first mowing deck portion, a second mowing deck portion, and a caster wheel assembly for supporting the articulating mowing deck. The first mowing deck portion includes a first cutting blade mounted to the first deck portion for rotation in a plane that is generally parallel to terrain over which the first deck portion travels. The second mowing deck portion includes a second cutting blade mounted to the second deck portion for rotation relative thereto. The second deck portion is pivotally attached to the first deck portion in a manner so that the second deck portion and second cutting blade are pivotable relative to the first deck portion about a horizontally disposed pivot axis. The pivot axis extends in a direction generally parallel to a forward drive direction of the lawn mower. The second deck portion and second cutting blade are pivotable about the pivot axis between a cutting position and a transport position. When the second deck portion and second cutting blade are in the cutting position, the second cutting blade rotates in a plane that is generally parallel to terrain over which the second deck portion travels. When the second deck portion and second cutting blade are in the transport position, the second deck portion and second cutting blade are pivoted upwardly from the terrain and generally toward the first deck portion about the pivot axis. The caster wheel assembly includes a mounting arm having a proximal portion and a distal portion, which carries a caster wheel. The proximal portion is mounted to the first deck portion on a first side of the pivot axis. The distal portion extends forwardly and laterally from the proximal portion so that the caster wheel carried by the distal portion is located on an opposite second side of the pivot axis.

While the principal advantages and features of the present invention have been described above, a more complete and thorough understanding and appreciation of the invention may be attained by referring to the Figures and detailed description of the preferred embodiments, which follow.

BRIEF DESCRIPTION OF THE DRAWINGS

The accompanying Figures, which are incorporated in and form a part of the specification, illustrate exemplary embodiments of the present invention and, together with the description, serve to explain the principles of the invention.

Figure 1:
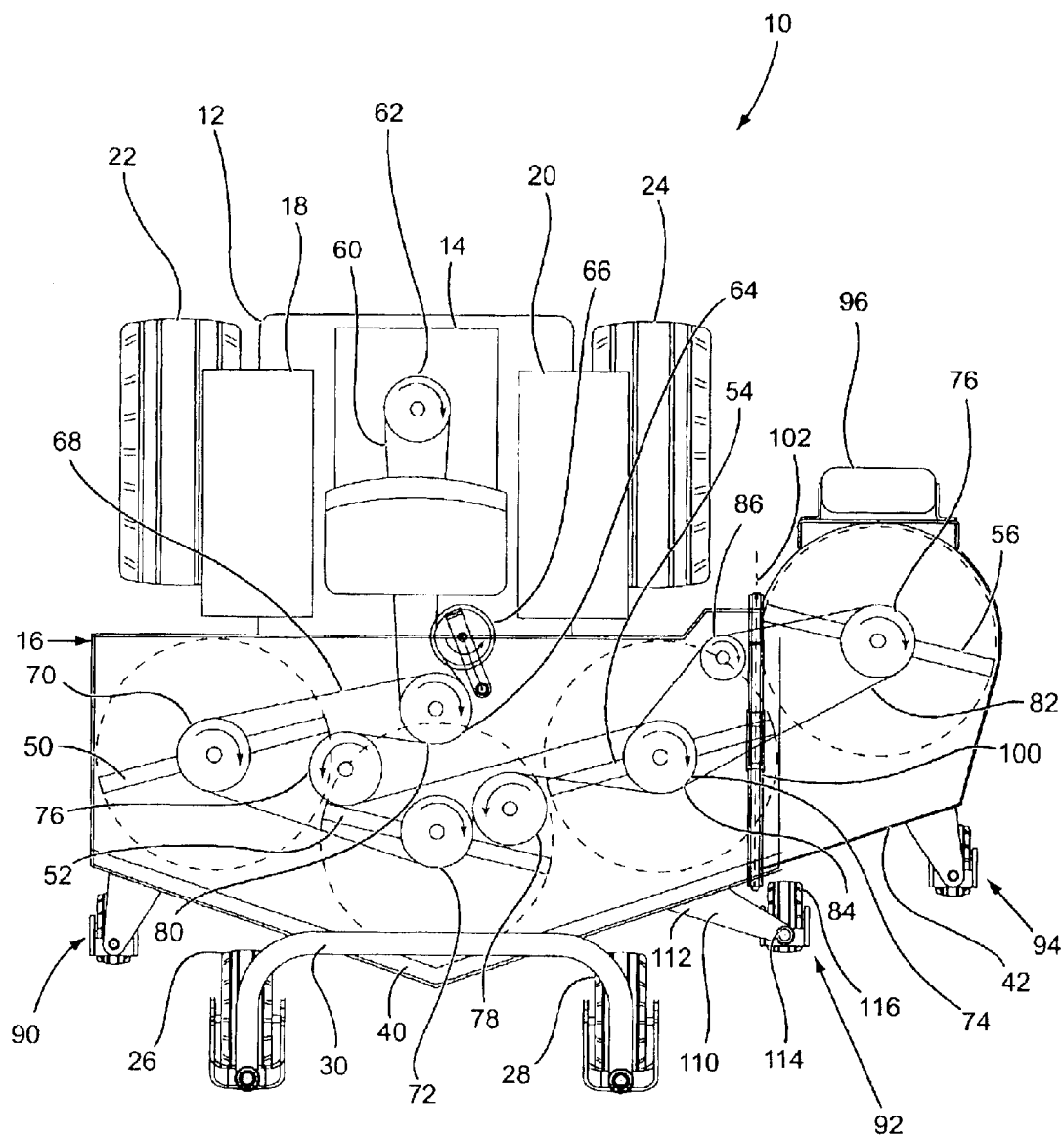
FIG. 1 is a top plan view of portions of a lawn mower of the present invention with multiple cutting blades carried by an articulating mowing deck and an offset support wheel supporting the mowing deck.

Reference characters shown in these Figures correspond to reference characters used throughout the following detailed description of the preferred embodiments.

DETAILED DESCRIPTION OF THE PREFERRED EMBODIMENTS

A lawn mower of the present invention is represented generally in FIG. 1 by the reference numeral 10. As illustrated somewhat schematically in FIG. 1, the lawn mower 10 comprises a main frame 12, which supports many of the components of the lawn mower, including an engine 14 and a mowing deck 16, which is described hereinafter. The engine 14 is preferably mounted to a rearward portion of the frame 12 and powers hydraulic drive units 18 and 20, as well as a cutting blade drive system, which is also described hereinafter. Rear drive wheels 22 and 24 support the rearward portion of the frame 12 and receive drive power from the hydraulic drive units 18 and 20, respectively. Forward support wheels 26 and 28 support the forward portion of the frame 12, and are preferably carried by a floating front axle 30, which pivots relative to the frame 12 to follow terrain contours and which swivels to facilitate turning of the lawn mower 10. For purposes of clarity, and because they form no critical part of the present invention, drive control components, deck control components and various other components commonly present in riding lawn mowers are not shown in FIG. 1.

The mowing deck 16 includes a first deck portion comprising a central or "inboard" mowing deck portion 40 and a second deck portion comprising deck wing or "outboard" mowing deck portion 42. It should be understood that, in an alternative embodiment of the invention, not shown in the drawings, another outboard deck wing portion may be connected to the laterally opposite side (the left side when viewed from the top as in FIG. 1) of the inboard mowing deck portion 40. In still another alternative embodiment of the invention, a single outboard deck wing portion may be connected to the left side (as viewed from the top) of the inboard mowing deck portion 40. The manner in which the inboard mowing deck portion 40 and outboard mowing deck portion 42 are connected to one another will be described hereinafter.

The inboard deck portion 40 has at least one an inboard cutting blade 54 mounted to the inboard deck portion 40 for rotation in a generally horizontal plane. As shown in FIG. 1, in the preferred embodiment of the invention, the inboard deck portion 40 includes a total of three such inboard cutting blades 50, 52 and 54. The outboard deck wing portion 42 preferably includes an outboard cutting blade 56 mounted to the outboard deck wing portion 42 for rotation relative thereto. The cutting blades 50, 52, 54 and 56 are driven by a system of belts and pulleys powered by the engine 14. A drive belt 60 is looped around an engine driven drive pulley 62 and a control pulley 64. Then drive pulley 62 preferably rotates in a clockwise direction (when viewed from the top as in FIG. 1) and, thus, the drive belt 60 and control pulley 64 also rotate in a clockwise direction. An idler pulley 66 maintains a proper degree of tension in the drive belt 60, as is well known in the art. As shown in FIG. 1, a serpentine belt 68 is looped around inboard pulleys 70, 72 and 74, which are coaxial with the inboard cutting blades 50, 52 and 54, respectively, around idler pulleys 76 and 78 (which maintain a proper degree of tension in the serpentine belt 68), and around a pulley 80 coaxial with the control pulley 64. Thus, inboard cutting blades 50, 52 and 54 also rotate in a clockwise direction, when engaged. With continued reference to FIG. 1, a third belt 82 is looped around an inboard pulley 84 coaxial with inboard pulley 74, around an outboard pulley coaxial with outboard cutting blade 56, and around an idler pulley 86 (which maintains a proper degree of tension in the third belt 82). Thus, when engaged, the outboard cutting blade 56 rotates in a clockwise direction as well. Mechanisms for engaging and disengaging this cutting blade drive system, and mechanisms for maintaining proper tension in the drive belts as the mowing deck portions move in response to changes in terrain, are known in the art.

As explained above, rear drive wheels 22 and 24 support the rearward portion of the frame 12 and forward support wheels 26 and 28 support the forward portion of the frame 12. However, these wheels do not necessarily support the weight of the inboard and outboard decks 40 and 42, which are preferably mounted to the frame 12 in a manner to permit some movement relative thereto. This allows the decks to "float" relative to the frame 12 and follow terrain contours as they are encountered by the mower 10. Thus, each of the inboard and outboard deck portions 40 and 42 requires at least some support from its own support wheels, which roll over the ground. Preferably, each of the inboard and outboard deck portions 40 and 42 is supported by at least one support wheel. As shown in FIG. 1, the inboard deck portion 40 is preferably supported, at least in part, by two caster wheel assemblies 90 and 92 connected to a forward (i.e., leading) edge portion of the inboard deck portion 40. Similarly, the outboard deck wing portion 42 is preferably supported, at least in part, by a caster wheel assembly 94, which is connected to a forward edge portion of the outboard deck wing portion 42. As shown in FIG. 1, the outboard deck wing portion 42 also preferably includes an elongate anti-scalping wheel 96 along its rearward edge portion.

In the preferred embodiment of the invention, the outboard deck wing portion 42 is pivotally attached to the inboard deck portion 40 via a hinge 100 in a manner so that the outboard deck wing portion 42 is pivotable about a horizontally disposed deck wing pivot axis 102 of the hinge 100, which extends generally from a forward end of the inboard deck portion 40 toward a rearward end of the inboard deck portion. The outboard deck wing portion 42 and the outboard cutting blade 56 it carries are pivotable about the deck wing pivot axis 102 between a cutting position wherein the outboard cutting blade 56 rotates in a plane that is generally parallel to terrain over which the outboard deck wing portion 42 travels and a transport position wherein the outboard deck wing portion 42 and outboard cutting blade 56 are pivoted upwardly from the terrain and generally inwardly toward the inboard deck portion. 40 about the deck wing pivot axis 102.

As illustrated in FIG. 1, the inboard caster wheel assembly 92 preferably includes a mounting arm 110 with a proximal portion 112 and a distal portion 114, which carries an offset swiveling caster wheel 116 that supports and facilitates travel of the inboard deck portion 40. Preferably, the proximal portion 112 of the mounting arm 110 is mounted to the forward edge of the inboard deck portion 40, inboard of the pivot axis 102, and the distal portion 114 of the mounting arm 110 extends forwardly and laterally outwardly from the proximal portion 112, so that the caster wheel 116 carried by the distal portion is "offset" from the proximal end 112 of the mounting arm 100 and located outboard of the deck wing pivot axis 102. This is preferable because the proximal end 112 of the caster assembly mounting arm 110 is located at point on the leading edge of the mowing deck to properly support the weight of the inboard deck portion 40, yet the caster wheel 116 carried by the distal end 114 of the caster assembly mounting arm 110 is located laterally outwardly of the pivot axis 102 to provide stable support for the mowing deck (whether the deck wing portion 42 is in its cutting position or its non-cutting, transport position). In other words, the caster wheel assembly 92 is configured in a manner to supports the weight of the inboard deck portion 40, while still providing a wide wheel base that actually extends beyond the outer edge of the inboard deck portion 40. Other advantages of this caster wheel assembly configuration are discussed below.

Figure 2:
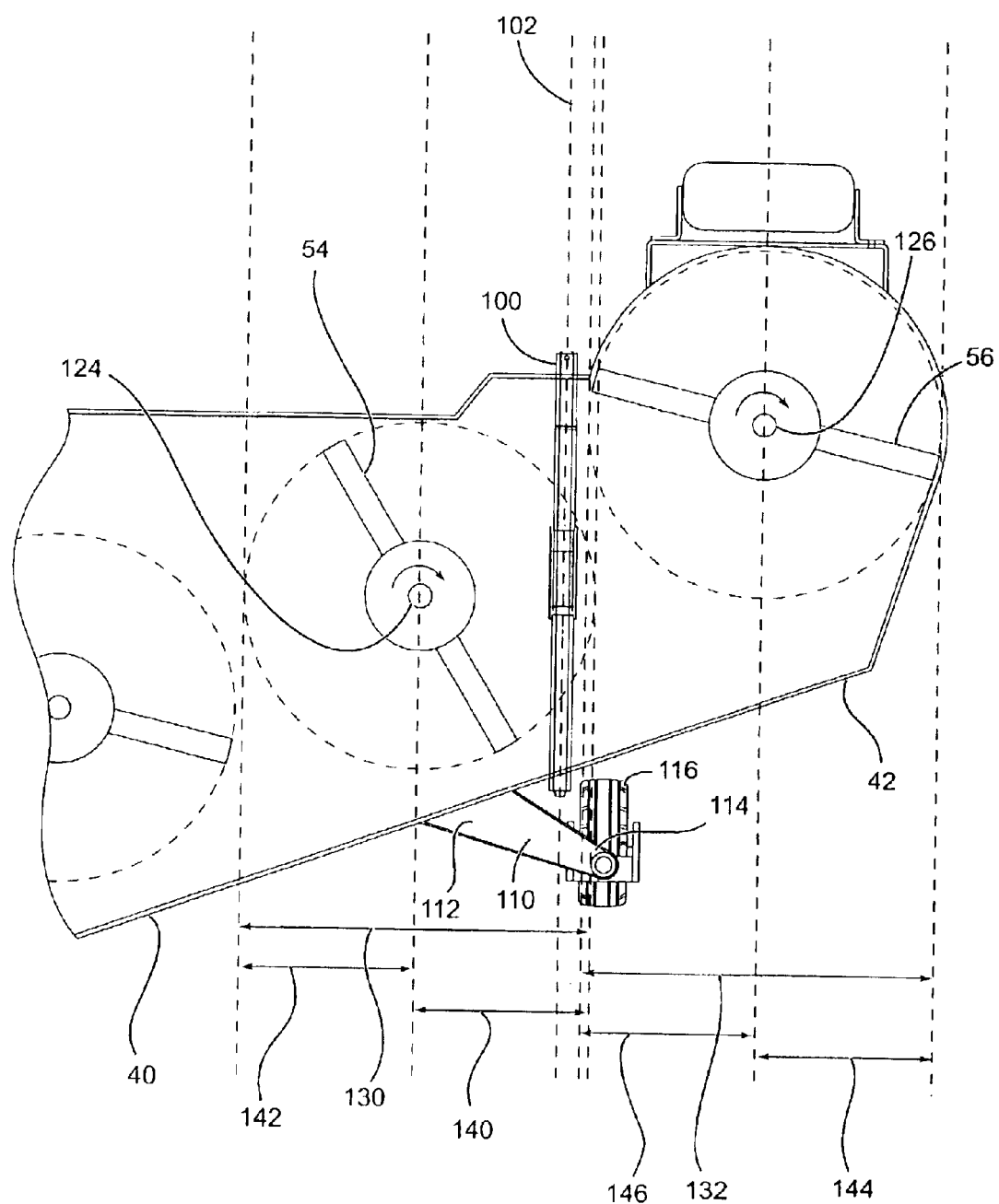
FIG. 2 is a top plan view of portions of the articulating mowing deck illustrating in greater detail various components of the mowing deck, offset support wheel and cutting blades.

FIG. 2 is a partial top plan view of the inboard deck portion 40 and outboard deck wing portion 42, which illustrates "cutting paths" of inboard cutting blade 54 and outboard cutting blade 56. As shown in FIG. 2, the blades 54 and 56 rotate about generally vertical shafts 124 and 126, respectively, which are offset from each other (inboard blade 54 slightly forward of outboard blade 56), so that their respective cutting paths overlap, but without the blades 54 and 56 interfering with one another. Inboard cutting blade 54 has an inboard cutting path 130 and outboard cutting blade 56 has an outboard cutting path 132. As shown in FIG. 2, the proximal portion 112 of the caster wheel assembly mounting arm 110 is located within the inboard cutting path 130, and the caster wheel 116 carried by the distal portion 114 of the mounting arm 110 is located within the outboard cutting path 132.

As shown in FIG. 2, the inboard cutting path 130 comprises an inboard approach path portion 140 in which the rotating inboard cutting blade 54 is moving generally forwardly, and an inboard return path portion 142 in which the rotating inboard cutting blade 54 is moving generally rearwardly. Similarly, the outboard cutting path 132 comprises an outboard approach path portion 144 in which the rotating outboard cutting blade 56 is moving generally forwardly, and an outboard return path portion 146 in which the rotating outboard cutting blade 56 is moving generally rearwardly. Thus, as shown in FIG. 2, the proximal portion 112 of the caster wheel assembly mounting arm 110 is located within the inboard approach path portion 140 of the inboard cutting path 130, and the caster wheel 116 carried by the distal portion 114 of the mounting arm 110 is located within the outboard return path portion 146 of the outboard cutting path 132.

The configuration of the caster wheel assembly 92 relative to these cutting paths is advantageous because it minimizes "streaking." As discussed above, in general, due to the overall weight of the mowing vehicle and mowing decks, prior art mowing deck support wheels located along the leading edge of the mowing deck can cause undesirable "streaking" by flatting the grass in their paths as they roll. As the wheels roll forwardly, the individual grass blades are bent forwardly and flattened against the ground. If the narrow path of grass that is flattened under a support wheel at the leading edge of the deck stays flattened as the cutting blades pass over, the flattened grass may not be properly cut by the blades, resulting in the undesirable "streaking" of grass behind the mower. However, again, in the present invention the caster wheel 116 is located within the outboard return path portion 146 of the outboard cutting path 132. As the rotating outboard cutting blade 56 moves generally rearwardly within the outboard return path portion 146, rearwardly directed air currents created by the portion of the outboard cutting blade 56 moving through the outboard return path portion 146 impinge against the forward leaning grasses, which causes the grass to stand back up so it is property cut by the blade 56, thereby reducing streaking of grass behind the mower.

As noted above, in the preferred embodiment of the invention, all of the cutting blades, including inboard cutting blade 54 and outboard cutting blade 56, rotate in a clockwise direction (when viewed from the top as in FIGS. 1 and 2). Thus, the respective approach path portions and return path portions arc arranged as shown in FIG. 2. Alternatively, the blades could rotate in a counterclockwise direction without departing from the scope of the present invention, in which case the locations of the approach path portion and return path portion for each cutting blade would be reversed.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. However, as various modifications could be made in the invention described and illustrated without departing from the scope of the invention, it is intended that all matter contained in the foregoing description or shown in the accompanying Figures shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lawn mower comprising:
   an articulating mowing deck having an inboard deck portion and an outboard deck wing portion being pivotally attached to the inboard deck portion in a manner so that the outboard deck wing portion is pivotable about a horizontally disposed deck wing pivot axis that extends generally from a forward portion of the mowing deck toward a rear portion of the mowing deck;
   an inboard cutting blade mounted to the inboard deck portion of the mowing deck for rotation in a generally horizontal plane;
   an outboard cutting blade mounted to the mowing deck outboard of the inboard cutting blade, the outboard cutting blade being mounted to the outboard deck wing portion of the mowing deck for rotation relative thereto, the outboard deck wing portion being pivotable about said deck wing pivot axis between a cutting position wherein the outboard cutting blade rotates in a plane that is generally parallel to terrain over which the outboard deck wing portion travels and a transport position wherein the outboard deck wing portion and the outboard cutting blade are pivoted upwardly from the terrain and generally inwardly toward the inboard deck portion about said deck wing pivot axis; and
   a caster wheel assembly for supporting and facilitating travel of the mowing deck, the caster wheel assembly having a mounting arm with a proximal portion mounted to a forward portion of the mowing deck located inboard of the deck wing pivot axis and a distal portion extending forwardly and laterally outwardly from the proximal portion so that a caster wheel carried by the distal portion of the mounting arm is located outboard of the deck wing pivot axis.

2. The lawn mower of claim 1 wherein:
   a cutting path of the outboard cutting blade comprises an outboard approach path portion in which a generally forwardly moving part of the rotating outboard cutting blade travels, and an outboard return path portion in which a generally rearwardly moving part of the rotating outboard cutting blade travels; and
   the caster wheel carried by the distal portion of the caster wheel assembly mounting arm is in the outboard return path portion of the cutting path of the outboard cutting blade.

3. The lawn mower of claim 2 wherein the outboard cutting blade rotates in a clockwise direction, when viewed from above.

4. The lawn mower of claim 2 wherein:
   a cutting path of the inboard cutting blade comprises an inboard approach path portion in which a generally forwardly moving part of the rotating inboard cutting blade travels, and an inboard return path portion in which a generally rearwardly moving part of the rotating inboard cutting blade travels; and
   the proximal portion of the caster wheel assembly mounting arm is mounted to the forward portion of the mowing deck within the inboard approach path portion of the cutting path of the inboard cutting blade.

5. The lawn mower of claim 4 wherein the outboard cutting blade and the inboard cutting blade each rotate in a clockwise direction, when viewed from above.

6. The lawn mower of claim 1 wherein the proximal portion of the caster wheel assembly mounting arm is mounted to the inboard deck portion.

7. A lawn mower comprising:
   an articulating mowing deck having an inboard deck portion and an outboard deck wing portion, the inboard deck portion having an inboard cutting blade mounted to the inboard deck portion for rotation in a generally horizontal plane, the outboard deck wing portion being pivotally attached to the inboard deck portion in a manner so that the outboard deck wing portion is pivotable about a horizontally disposed deck wing pivot axis that extends generally from a forward portion of the articulating mowing deck toward a rear portion of the articulating mowing deck, the outboard deck wing portion being pivotable about said deck wing pivot axis between a cutting position wherein an outboard cutting blade mounted to the outboard deck wing portion rotates in a plane that is generally parallel to terrain over which the outboard deck wing portion travels and a transport position wherein the outboard deck wing portion and outboard cutting blade are pivoted upwardly from the terrain and generally inwardly toward the inboard deck portion about said deck wing pivot axis; and
   a caster wheel assembly for supporting and facilitating travel of the mowing deck, the caster wheel assembly having a mounting arm with a proximal portion mounted to the inboard deck portion inboard of the pivot axis and a distal portion extending forwardly and laterally outwardly from the proximal portion so that a caster wheel carried by the distal portion of the mounting arm is located outboard of the deck wing pivot axis.

8. The lawn mower of claim 7 wherein the proximal portion of the caster wheel assembly mounting arm is mounted to the inboard deck portion in a location within a cutting path of the inboard cutting blade, and wherein the distal portion of the caster wheel assembly mounting arm extends forwardly and laterally outwardly from the proximal portion so that the caster wheel carried thereby is located within a cutting path of the outboard cutting blade.

9. The lawn mower of claim 8 wherein:
   the cutting path of the outboard cutting blade comprises an outboard approach path portion in which a generally forwardly moving part of the rotating outboard cutting blade travels, and an outboard return path portion in which a generally rearwardly moving part of the rotating outboard cutting blade travels; and
   the caster wheel carried by the distal portion of the caster wheel assembly mounting arm is in the outboard return path portion of the cutting path of the outboard cutting blade.

10. The lawn mower of claim 9 wherein the outboard cutting blade rotates in a clockwise direction, when viewed from above.

11. The lawn mower of claim 9 wherein:
   the cutting path of the inboard cutting blade comprises an inboard approach path portion in which a generally forwardly moving part of the rotating inboard cutting blade travels, and an inboard return path portion in which a generally rearwardly moving part of the rotating inboard cutting blade travels; and
   the proximal portion of the caster wheel assembly mounting arm is mounted to the forward portion of the mowing deck within the inboard approach path portion of the cutting path of the inboard cutting blade.

12. The lawn mower of claim 11 wherein the outboard cutting blade and the inboard cutting blade each rotate in a clockwise direction, when viewed from above.

13. A lawn mower with an articulating mowing deck, the lawn mower comprising:
- a first mowing deck portion having a first cutting blade mounted to the first deck portion for rotation in a plane that is generally parallel to terrain over which the first deck portion travels;
- a second mowing deck portion having a second cutting blade mounted to the second deck portion for rotation relative thereto, the second deck portion being pivotally attached to the first deck portion in a manner so that the second deck portion and second cutting blade are pivotable relative to the first deck portion about a horizontally disposed pivot axis that extends in a direction generally parallel to a forward drive direction of the lawn mower, the second deck portion and second cuffing blade being pivotable about said pivot axis between a cutting position wherein the second cutting blade rotates in a plane that is generally parallel to terrain over which the second deck portion travels and a transport position wherein the second deck portion and second cutting blade are pivoted upwardly from the terrain and generally toward the first deck portion about said pivot axis; and
- a caster wheel assembly for supporting the articulating mowing deck, the caster wheel assembly having a mounting arm with a proximal portion mounted to the first deck portion on a first side of the pivot axis and a distal portion extending forwardly and laterally from the proximal portion so that a caster wheel carried by the distal portion of the mounting arm is located on an opposite second side of the pivot axis.

14. The lawn mower of claim 13 wherein the proximal portion of the caster wheel assembly mounting arm is mounted to the first deck portion in a location within a cutting path of the first cutting blade, and wherein the distal portion of the caster wheel assembly mounting arm extends forwardly and laterally from the proximal portion so that the caster wheel carried thereby is located within a cutting path of the second cutting blade.

15. The lawn mower of claim 14 wherein:
- the cutting path of the first cutting blade comprises an first approach path portion in which a generally forwardly moving part of the rotating first cutting blade travels, and an first return path portion in which a generally rearwardly moving part of the rotating first cutting blade travels; and
- the proximal portion of the caster wheel assembly mounting arm is mounted to the forward portion of the mowing deck within the first approach path portion of the cutting path of the first cutting blade.

16. The lawn mower of claim 15 wherein the first cutting blade rotates in a clockwise direction, when viewed from above.

17. The lawn mower of claim 15 wherein:
- the cutting path of the second cutting blade comprises an second approach path portion in which a generally forwardly moving part of the rotating second cutting blade travels, and an second return path portion in which a generally rearwardly moving part of the rotating second cutting blade travels; and
- the caster wheel carried by the distal portion of the caster wheel assembly mounting arm is in the second return path portion of the cutting path of the second cutting blade.

18. The lawn mower of claim 17 wherein the first and second cutting each rotate in a clockwise direction, when viewed from above.

* * * * *